Feb. 25, 1936. H. S. ROWTON ET AL 2,031,856
MACHINE FOR FILLETING FISH
Filed Oct. 25, 1933 3 Sheets-Sheet 2
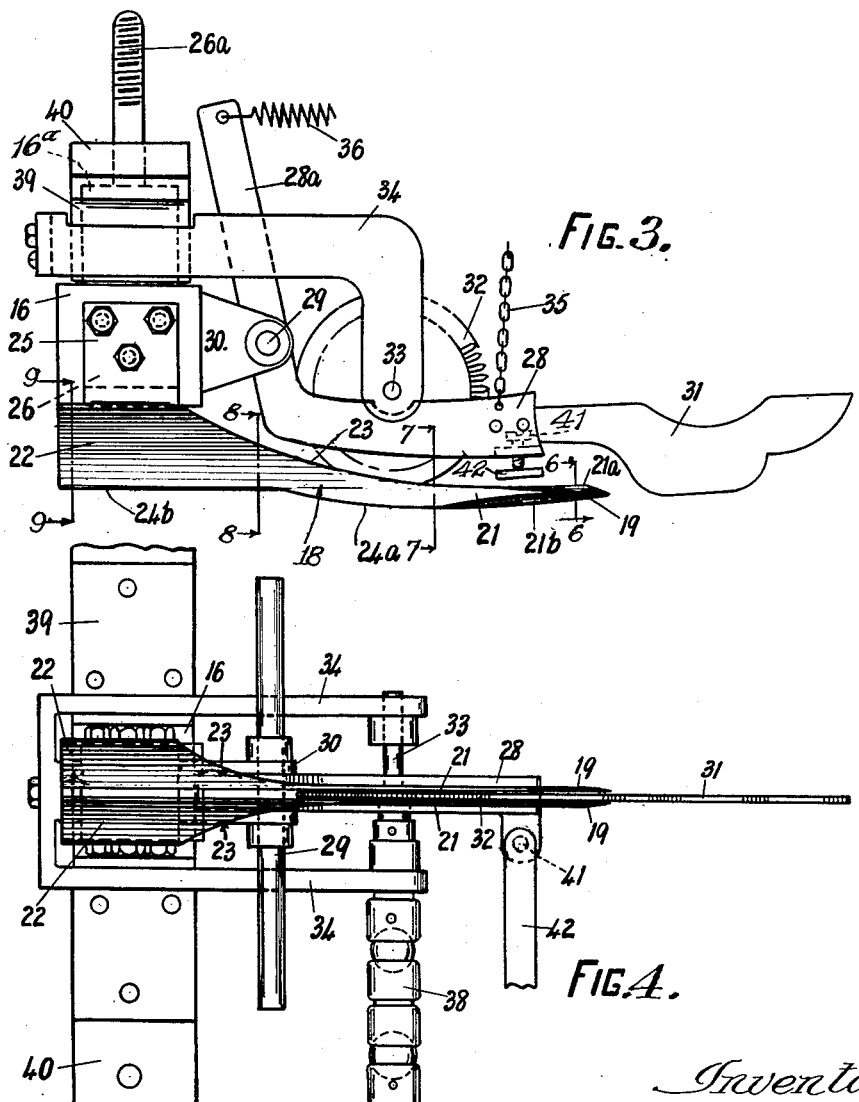

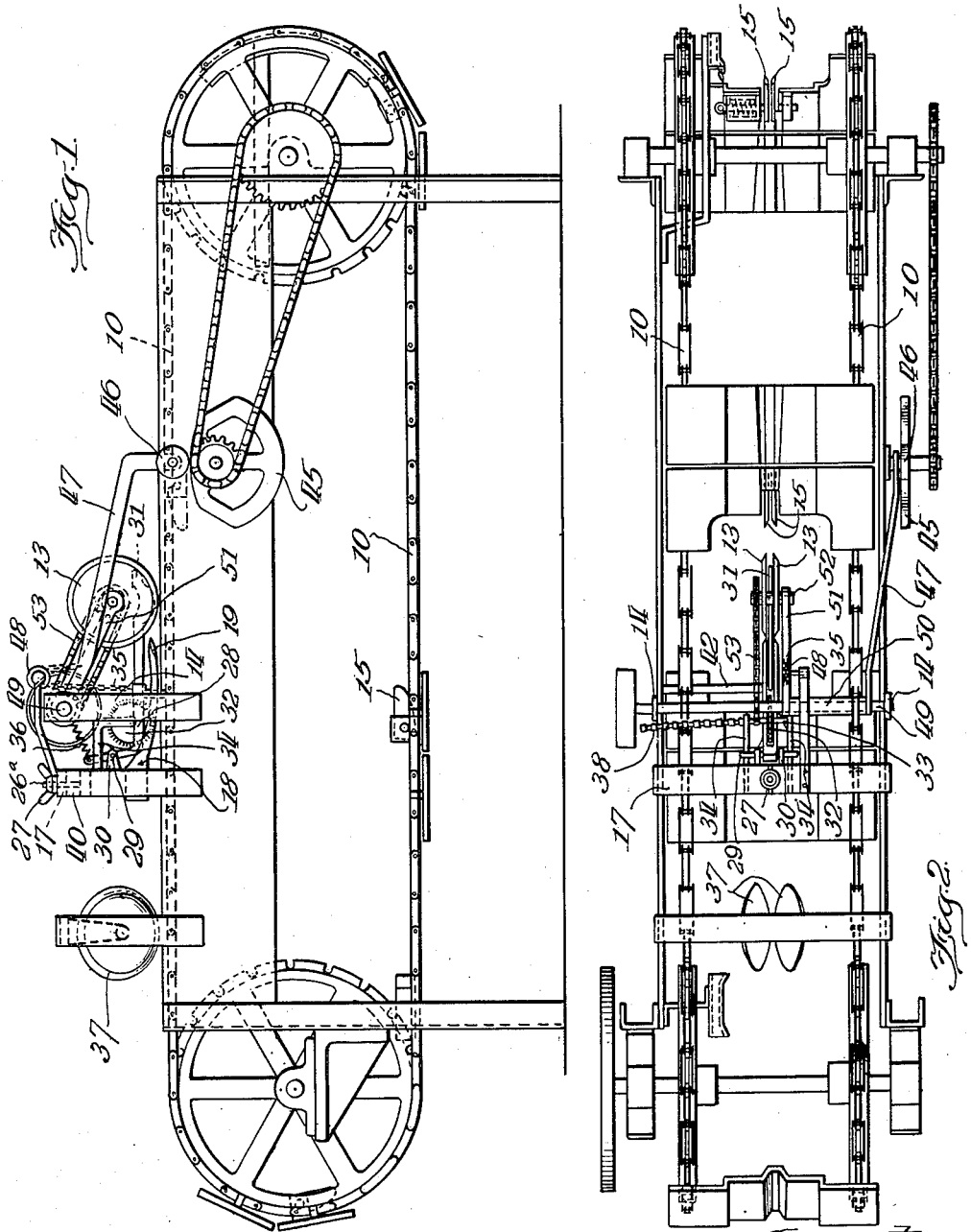

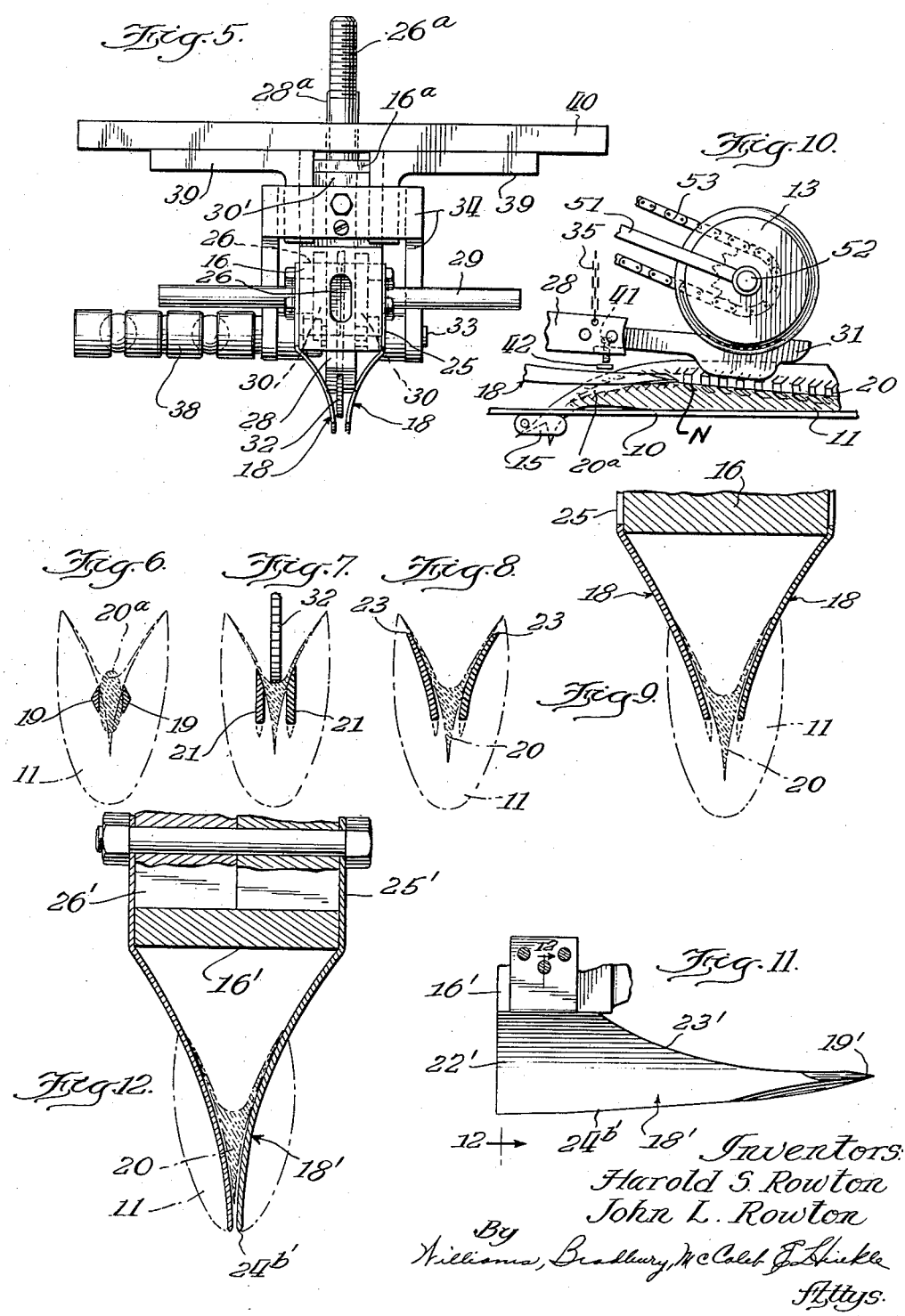

UNITED STATES PATENT OFFICE 2,031,856

MACHINE FOR FILLETING FISH

Harold Stanley Rowton and John Leslie Rowton, Aberdeen, Scotland

Application October 25, 1933, Serial No. 695,092
In Great Britain October 29, 1932

31 Claims. (Cl. 17—3)

This invention has for its object to provide an improved apparatus for mechanically removing the flesh from the prismatic portion of the backbone of decapitated and eviscerated fish of the class having a backbone which comprises a prismatic spinal column terminating in a substantially flat or oval-shaped spinal column, such as cod, haddock, hake, ling, pollock, bream and like salt water or fresh water fish.

A further object of the invention is to provide an improved apparatus which, while mechanically removing the flesh from the prismatic spinal column of such fish, will adapt itself to the natural curvature in the lengthwise direction of the backbone.

In the filleting of such fish by hand labour it is usual to split the flesh on each side of the backbone to form two separate fillets of fish severed from one another at the backbone. In some cases, however, the backbone is removed without splitting the fish into two separate fillets, the latter process being known as block filleting. The present invention further has for its object to provide an improved machine for enabling either block filleting to be mechanically accomplished or to enable the fish to be mechanically split into two fillets.

According to the invention the improved apparatus for mechanically removing the flesh from the prismatic portion of the backbone of fish of the class stated comprises a double-bladed filleting tool stationarily mounted with respect to a conveyer adapted to convey the fish tail foremost (after it has been previously decapitated, eviscerated and slit along the oval portion of the backbone up to the navel or base of the prismatic spinal column) with the ventral or underside of the fish directed towards the filleting tool, the latter comprising a pair of blades spaced apart and having pointed forward extremities to enter the flesh of the fish at the two sides of the prismatic spinal column, and having elongated narrow portions in the rear of said forward extremities, said elongated portions gradually increasing in width towards the rear and each having a curved cutting edge which conforms to the curved anatomical shape of the prismatic spinal column so as to cut through the flesh close to the sides of the prismatic spinal column which passes between the two blades.

The blades are preferably curved transversely from a point in rear of their pointed extremities to the rear of the blades, said transverse curvature conforming to the curved anatomical lateral shape of the prismatic spinal column.

Although it is preferred to mount the filleting tool in a stationary position with respect to a conveyer for carrying the fish past the tool, it will be understood that the fish could be held while travelling the tool past the fish. In either case it is essential however that the tool be so mounted that it does not move during the actual operation of the tool towards or away from the surface upon which the fish rests, although the tool may be adjustable towards or away from said surface when not in operation, for the purpose of adapting the tool to different sizes of fish.

Those edges of the blades which enter deeper into the fish may be shaped to cut through the back or dorsum of the fish on each side of the dorsal fins, leaving two fillets, or they may be so shaped that they do not penetrate the back or dorsum of the fish, in which case the central bone may be subsequently removed in such a manner that the fish is produced as one fillet.

In order that the invention may be more clearly understood, reference is hereinafter made to the accompanying drawings illustrating one manner of carrying out the invention.

Fig. 1 is an elevational view of one side of the fish-dressing machine;

Fig. 2 is a plan view of the machine shown in Fig. 1;

Fig. 3 is a detail elevational view of the filleting tool and its associated parts;

Fig. 4 is a detail inverted plan view of the filleting tool shown in Fig. 3;

Fig. 5 is a detail end view of the filleting tool shown in Fig. 3;

Figs. 6, 7, 8 and 9 are sectional views through the blades of the filleting tool on the lines 6—6, 7—7, 8—8 and 9—9 respectively of Fig. 3, looking from the left of Fig. 3 to the right thereof. In these figures a section through a fish and the prismatic portion of its backbone is shown in phantom. The fish is assumed to be far enough along the blades so that the positions indicated in said figures denote simultaneous cutting action. In addition in Fig. 6 a phantom cross-section of the oval portion of the spinal column of the fish is included merely for the purpose of illustrating in this same figure the initial relationship of the blades and this particular portion of the spinal column.

Fig. 10 is a detail fragmentary elevational view of the filleting tool illustrating the start of the filleting operation.

Fig. 11 is an elevational view of one side of the modified filleting tool.

Fig. 12 is a cross-sectional view of the modified filleting tool taken on the line 12—12 of Fig. 11; a fish and the prismatic portion of its backbone being shown in phantom to illustrate how the blades cut the fish into two fillets.

As shown in Fig. 1, the machine comprises a conveyer 10 adapted to convey by tail clamps 15 the decapitated fish 11 (tail foremost) with its ventral or underside directed towards a double bladed filleting tool 12 arranged to operate upon the fish after it has been previously slit along the two sides of the flat or oval spinal column up to the navel or base of the prismatic portion of the spinal column by parallel rotary disc knives 13 mechanically rotated by means not shown and hung from brackets 14 so that the knives can be lifted automatically by an arrangement such as shown in Figs. 1 and 2 when they reach the prismatic portion of the spinal column of the fish. This arrangement as illustrated may comprise a cam 45 rotated in timed relationship with the conveyer 10, a cam roller 46 riding on said cam 45 and actuating a lever 47 fixed to one end of a sleeve 50 rotatably mounted on a shaft 49 and an arm 51 fixed to the opposite end of the sleeve 50 and carrying said slitting knives 13 on a shaft 52. It will be noted that with this arrangement the cam 45 periodically raises and lowers the knives 13 through the interposition of the parts described.

The filleting tool 12 is attached to a bridge member 17 straddling the conveyer 10 and the filleting tool 12 comprises a pair of blades indicated as a whole by the numeral 18 and spaced apart and having pointed forward extremities 19.

Each blade 18 has an elongated narrow forward portion 21 formed with an upper cutting edge 21a and a lower cutting edge 21b which diverge gradually from one another from the pointed extremity 19. The cutting edges 21a and 21b are formed by grinding off the outer face of the blade. The blade 18 continues backwards from the cutting edge 21a in a gradual upward curve 23 which is formed as a cutting edge by grinding off the inside face of the blade. The lower cutting edge 21b is continued backwards as a blunt edge 24a which rises with a more gradual curve than the edge 23 and finally terminates in a straight blunt lower edge 24b. From the pointed extremity 19 to the rear of the cutting edge 23 the blade gradually increases in width, that is to say, in distance between its upper and lower edges. Also from about a point in rear of the line 7—7 the blade is curved transversely, as more clearly seen in Figs. 8 and 9 until it finally terminates at the rear in the wider rear portion 22. The edge 23 thus curves both upwards and outwards from front to rear and the edge 23 and transverse curvature of the blade are made to conform to the curved shape of the sides of the prismatic portion of the spinal column of the fish on which the filleting tool is designed to operate. Thus the edge 23 and transverse curvature of the blade will be determined by the anatomy and size of the fish to be filleted by the tool.

Each blade 18 (see Fig. 5) has an integral lug portion 25 to the inside face of which is secured a block 26. The two blocks 26 fit side by side in a box-shaped holder 16 which is carried at the lower end of a square stud 16a. The stud 16a is held between a pair of guides or clamps 39 secured to the underside of a cross-bar 40 which fits under the bridge member 17. A screw-threaded pin 26a projects up from the square stud 16a (Figs. 3 and 5) through the bar 40 and bridge member 17 (Figs. 1 and 2) to receive a nut 27 or the like for suspending the blades 18 from the bridge member 17. The distance between the blades 18 can be adjusted either by substituting wider blocks 26 or by inserting distance pieces between the blocks 26.

An arm 28 (Fig. 3) is pivotally attached at 29 to an extension 30 on the box-shaped holder 16, said arm 28 being situated over the space between the two filleting blades 18.

The arm 28 is prevented from descending beyond a predetermined limit by an adjustable abutment screw 41 (Fig. 3) on the arm 28 engaging a stop 42 (Fig. 4) projecting inwards from the side of the machine. An upward extension 28a of the arm 28 is attached to one end of a spring 36, the other end of which is attached to any convenient fixed part 17 of the machine. A forward extension 31 on the arm 28 is of such reduced thickness as to fit between the two parallel slitting knives 13.

On the arm 28 is attached a chain 35 which passes over a pulley 48 fixed in a convenient position on the machine and is then secured to the arm 51 which carries the slitting knives 13. The chain 35 is of such length as to cause the arm 28 to be raised when the slitting knives 13 are at their lowest position and vice versa, the arm 28 being caused to fall by the action of the spring 36, to the prescribed limit fixed by the adjustable abutment screw 41 when the knives 13 rise out of the fish. The object of this movement is to overcome the tendency of the slitting knives 13 to lift the fish off the conveyer when they are raised. Therefore when the knives 13 are cutting, the arm 28 and extension 31 are raised, and as the knives 13 are raised, the parts 28 and 31 correspondingly lower on to the fish.

A circular toothed disc 32 is mounted on a shaft 33 supported in a bracket 34 secured to the stud 16a, the disc 32 being driven by flexible shafting 38, at a peripheral speed substantially equal to or slightly faster than the surface speed of the conveyer 10.

The operation of the machine is as follows:—

The previously decapitated and eviscerated fish gripped by the tail clamps 15 and resting on the conveyer 10 is carried past the two parallel slitting knives 13 which slit open the fish along the two sides of the oval spinal column indicated by the numeral 20a in Fig. 10 up to the navel N at the base of the prismatic spinal column 20. The knives 13 are then lifted out by the arm 51 as the cam 45 raises the cam roller 46 and lever 47 and the fish is carried on towards the filleting tool. The points 19 of the blades of the filleting tool pass along each side of the oval bone in the cut made by the circular splitting knives 13 and as the fish progresses the points 19 of the blades enter the flesh at the sides of the prismatic bone as seen in Fig. 6, so that the fish is firmly impaled on the elongated narrow forward portions 21 of the blades. The forward blade portions 21 enter the flesh in a direction which is substantially parallel to the line of the prismatic spinal column 20. When the prismatic section of the bone reaches the curved cutting edge 23, the latter commences to cut the flesh from the sides of the prismatic bones close thereto as clearly seen from Figs. 7, 8 and 9 until the sides of the prismatic bone have been cut from the flesh. During this operation, the prismatic bones pass between the blades 18 and out through the space at the back of the blades.

In order to prevent the points 19 of the filleting tool from passing through the back or dorsum of the fish, a device is preferably provided for holding down the head end H of the prismatic bone during the operation of the filleting tool. said holding-down device as shown comprises the extension 31 situated between the slitting knives 13, said extension 31 engaging the top of the prismatic bone as the filleting blades 18 pass through the fish and holding the head end H of the prismatic bone down while the curved cutting edges 23 of the blades sever the flesh from the bone. The filleting operation is also caused to conform to the natural longitudinal curvature of the prismatic spinal column 20, the extension 31 riding over the curved prismatic bone and thus enabling the filleting blades 18 to follow the longitudinal curvature of the central bone. The arm 28 holds the fish in contact with the cutting edges 23 as the fish passes between the blades 18.

The circular toothed disc 32 rests upon the flat uppermost face of the prismatic bones and is rotated at such a speed as to assist in feeding the prismatic bones through the space between the blades 18.

As shown in Figs. 3–9, the lower edge 24b of the blades 18 is blunt and slightly elevated so that it does not cut through the back of the fish. After the fish has left the filleting tool, the backbone may be completely cut out in known manner by angularly related rotary boning knives 37 so that the fish is produced as one fillet.

In the construction shown in Figs. 11 and 12, the blades 18' have their lower edges 24b' formed as deep cutting edges which are designed to cut through the back of the fish on each side of the dorsal fins, so that the fish is delivered from the filleting tool in the form of two fillets.

The machine may be fitted with alternately operating slitting knives 13 arranged to slit the fish first along one side and then the other of the oval spinal column up to the prismatic bone, or the said slitting may be previously accomplished by hand labour.

Means are preferably provided for adjusting the filleting tool transversely with respect to the surface on which the fish rests and for adjusting the tool to vary the distance of the filleting blades from the conveyer or surface on which the fish rests and for adjusting the blades towards or away from each other.

If the conveyer track is straight as shown in Fig. 1, the blades of the filleting tool will be straight or substantially straight and parallel or nearly parallel to the straight conveyer track, as shown in Figs. 1–12, but if the fish are conveyed upon a curved conveyer track, the blades of the filleting tool will be curved to conform to the curvature of the conveyer track.

If desired, the two blades 18 of the filleting tool, as also the pair of circular slitting knives 13, may be arranged with the blades or knives in series one behind the other, so as to operate upon the fish in succession.

Instead of the conveyer shown, the fish may be conveyed while resting on its back upon or in the periphery of a rotary drum conveyer having a horizontal axis or while resting with its back upon or in the periphery of a rotary drum or rotary table type conveyer having a vertical or inclined axis, or the fish may rest with its back on or in the surface of an endless belt or chain conveyer which may travel in a vertical plane or in an inclined plane instead of in a horizontal plane as in Fig. 1. In all cases the ventral portion of the fish to be presented to the filleting tool will be directed outwards from the conveyer.

Alternatively the fish may rest on its side in or on a conveyer of any of the above-mentioned types with the ventral portion of the fish presented to the filleting tool, which in such case will be situated laterally at one side of the conveyer and will be turned through 90 degrees from the position shown in Fig. 1.

Although it is preferred to convey the fish as above indicated, the machine may be arranged to convey the fish with its ventral portion directed inwards or resting in or protruding through a slot in the conveyer surface, the filleting tool being encircled by the conveyer and operating upon the inwardly directed ventral portion of the fish.

We claim:

1. A filleting tool for a fish-dressing machine comprising a pair of spaced elongated blades positioned adjacent the surface of the machine upon which the fish rests, means for supporting said blades in position in relation to said surface, each of said blades having a pointed forward extremity and a cutting edge which gradually recedes further from said surface as the cutting edge approaches the rear of said blade, said cutting edges also diverging away from each other towards the rear of said blades.

2. A filleting tool according to claim 1 wherein the blades have parallel slightly curved under-edges opposite said cutting edges, said under-edges having their forward portions formed as cutting edges and their rearward portions made blunt and shaped to be positioned further from the surface upon which the fish rests than said under-edges are positioned at their forward portions.

3. A filleting tool according to claim 1 wherein the blades have parallel and substantially straight under-edges opposite said curved cutting edges, said under edges being formed as cutting edges and approaching nearer to the surface upon which the fish rests as they approach the rear of the tool.

4. A filleting tool for association with the conveyer of a fish-dressing machine, comprising a pair of blades spaced uniformly apart at their lower edges and having their upper edges curved to recede from each other as they approach the rear and to curve upwards away from the lower edges as they approach the rear, said blades having sharpened forward portions and their upper edges formed as cutting edges.

5. A filleting tool as specified in claim 4 having means under which the prismatic portion of the backbone rides to hold it in contact with the curved cutting edges.

6. In a fish-dressing machine, a fish conveyor, means on the conveyor for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in rear of the slitting knives, means for mounting said tool to operate upon the sides of the prismatic portion of the backbone, said tool comprising a pair of spaced elongated blades between which said prismatic portion passes, each blade having a curved cutting edge for cutting the flesh of the fish from the prismatic portion of the backbone, and means associated with said filleting tool for resting on the prismatic bones to hold down the front portion thereof, thereby to prevent the pointed extremities of the blades from passing through the back of the fish.

7. In a fish-dressing machine, a fish conveyor, means on the conveyor for engaging the tail of the fish after it has been decapitated and eviscerated, a pair of knives associated with the conveyor and arranged to slit the fish on each side of the oval portion of the backbone, means for moving said knives into an inoperative position on reaching the prismatic portion of the backbone, a filleting tool in rear of the slitting knives, means for mounting said tool to operate upon the sides of the prismatic portion of the backbone, said tool comprising a pair of spaced elongated blades between which said prismatic portion passes, each blade having a curved cutting edge conforming to the curved lateral shape of the prismatic portion of the backbone, and means associated with said filleting tool for causing the blades thereof to conform in operation to the longitudinal curvature of the prismatic portion of the backbone of the fish.

8. In a fish-dressing machine, a fish conveyor, means on the conveyor for engaging the tail of the fish after it has been decapitated and eviscerated, a pair of knives associated with the conveyor and arranged to slit the fish on each side of the oval portion of the backbone, means for moving said knives into an inoperative position on reaching the prismatic portion of the backbone, a filleting tool in rear of the slitting knives, means for mounting said tool to operate upon the sides of the prismatic portion of the backbone, said tool comprising a pair of spaced elongated blades between which said prismatic portion passes, each blade having a curved cutting edge for cutting the flesh of the fish from the prismatic portion of the backbone, a device situated between the slitting knives and adapted to rest on the fish, and a conveying element situated between the blades of said filleting tool and engageable with the backbone of the fish to convey it through the space between the blades.

9. In a fish-dressing machine, a fish conveyor, means on the conveyor for engaging the tail of the fish after it has been decapitated and eviscerated, a pair of rotatably driven spaced parallel circular slitting knives associated with the conveyor and arranged to slit the fish on each side of the oval portion of the backbone, means for moving said knives into an inoperative position on reaching the prismatic portion of the backbone, a filleting tool in rear of the slitting knives, means for mounting said tool to operate upon the sides of the prismatic portion of the backbone, said tool comprising a pair of spaced elongated blades between which said prismatic portion passes, each blade having a curved cutting edge for the filleting operation, a device situated between the slitting knives and adapted to rest on the fish, a toothed feed wheel rotatable between the blades of said filleting tool and engageable with the backbone of the fish, and means for rotating said wheel.

10. In a fish-dressing machine, a fish conveyor, means for holding the fish on the conveyor after it has been decapitated and eviscerated, means for slitting the fish on each side of the oval portion of the backbone, means for automatically moving said slitting means out of operative position when said means reach the prismatic portion of the backbone, means for maintaining the fish on the conveyor as the slitting means are moved out of operative position and for holding the fish on the conveyor at a point spaced from said mentioned holding means, means for filleting the fish closely along the natural curvature in the lengthwise direction of the backbone, and means contacting said backbone for conveying it through said filleting means.

11. In a fish-dressing machine, a fish conveyor, means for holding the fish on the conveyor after it has been decapitated and eviscerated, means for slitting the fish on each side of the oval portion of the backbone, means for automatically moving said slitting means out of operative position when said means reach the prismatic portion of the backbone, means for maintaining the fish on the conveyor as the slitting means are moved out of operative position and for holding the fish on the conveyor at a point spaced from said mentioned holding means, means for filleting the fish closely along the natural curvature in the lengthwise direction of the backbone, means contacting said backbone for conveying it through said filleting means, and means for under-cutting said backbone to completely separate it from the fish.

12. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

13. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated portion in the rear thereof, and a portion gradually increasing in width from said elongated portion toward its rear and having a cutting edge curved to cut close to the sides of the prismatic portion of the backbone, each blade being curved transversely from a point in the rear of its pointed extremity to the rear of said blade to conform to the transverse curvature of the sides of said prismatic portion.

14. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone, a second cutting edge being provided on each blade at the edge opposite said curved cutting edge and being shaped to cut through the back of the fish to cause the filleting tool to divide the fish into two fillets, one on each side of the backbone.

15. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width toward its rear and has a curved cutting edge which conforms to the curved shape of the sides of the prismatic bone so as to cut close to the sides of said bone, a blunt edge being provided on each blade at the edge opposite said curved cutting edge and being shaped to avoid its penetration through the back of the fish.

16. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone, said filleting tool having associated therewith means adapted to rest upon said prismatic bone to hold down the front portion thereof and thereby prevent the pointed extremity of each blade from passing through the back of the fish.

17. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone, said filleting tool having associated therewith means for causing the prismatic bone of the fish to contact with the filleting blades to enable said blades to follow the longitudinal curvature of said bone.

18. A filleting tool for mechanically removing the flesh from the prismatic portion of the backbone of a decapitated and eviscerated fish of the class described, comprising a pair of blades spaced apart for the passage of the backbone between them, a conveying element situated between the blades of the tool and engageable with the backbone of the fish to convey it through the space between the blades, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

19. A filleting tool for mechanically removing the flesh from the prismatic portion of the backbone of a decapitated and eviscerated fish of the class described, comprising a pair of blades spaced apart for the passage of the backbone between them, a toothed wheel rotatable between the blades of the tool and engageable with the backbone of the fish to convey it through the space between the blades, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

20. In a fish-dressing machine, a fish conveyer, means on the conveyer for engaging the tail of the fish after it has been decapitated and eviscerated, a slitting device associated with the conveyer for slitting the fish from its tail, means for moving said slitting device into an inoperative position when it reaches the prismatic portion of the backbone, a filleting tool immediately behind the slitting device, and means for rigidly mounting said tool relatively to the conveyer, said tool comprising a pair of spaced elongated blades terminating in pointed forward extremities and increasing gradually in width towards the rear, each blade having a curved cutting edge which conforms to the curved shape of the sides of the prismatic portion of the backbones of the fish which pass between said blades.

21. In a fish-dressing machine, a fish conveyer, means on the conveyer for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in the rear of the slitting knives, means for mounting said tool to operate upon the sides of the prismatic portion of the backbone, said tool comprising a pair of spaced elongated blades between which said prismatic portion passes and each blade having a cutting edge curved to cut close to the side of the prismatic portion of the backbone, and a device situated between the slitting knives and adapted to rest on the fish.

22. In a fish-dressing machine, a fish conveyer, means on the conveyer for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in the rear of the slitting knives, means for mounting said tool to operate upon the sides of the prismatic portion of the backbone, said tool comprising a pair of spaced elongated blades between which said prismatic portion passes and each blade having a cutting edge curved to cut close to the side of the prismatic portion of the backbone, a device situated between the slitting knives and adapted to rest on the fish, and a pair of angularly related rotatable knives in the rear of the filleting tool for under-cutting the backbone of the fish to completely separate it therefrom.

23. A filleting tool for a fish-dressing machine comprising a pair of spaced elongated blades, an adjustable means for mounting said blades in proper relationship to the machine, each blade comprising an elongated narrow forward portion, an upper cutting edge formed on said portion, a lower cutting edge formed on said portion, said edges gradually diverging from one another from a pointed extremity on said portion, a gradually rising upwardly curved edge extending back from said upper cutting edge and formed as a cutting edge, a lower upwardly curved blunt edge extending back from said lower cutting edge and rising with a more gradual curve than said upwardly curved edge and terminating in a straight edge, and each blade having a transverse curvature, and the upwardly curved cutting edge and the transverse curvature of each blade being determined by the anatomy and size of the fish to be filleted.

24. A filleting tool for a fish-dressing machine, comprising a pair of spaced elongated blades, an adjustable means for mounting said blades in proper relationship to the machine, each blade comprising an elongated narrow forward portion, an upper cutting edge formed on said portion, a lower cutting edge formed on said portion, said edges gradually diverging from one another from a pointed extremity on said portion, a gradually rising upwardly curved edge extending back from said upper cutting edge and formed as a cutting edge, a lower upwardly curved blunt edge extending back from said lower cutting edge and rising with a more gradual curve than said upwardly curved edge and terminating in a straight edge, and each blade having a transverse curvature, the upwardly curved cutting edge curving outwardly from front to rear and said cutting edge and the transverse curvature of each blade being made to confrom to the curved shape of the sides of the prismatic portion of the spinal column of the particular class of fish on which said tool is to operate.

25. A filleting tool for a fish-dressing machine, comprising a pair of spaced elongated blades, an adjustable means for mounting said blades in proper relationship to the machine, each blade comprising an elongated narrow forward portion, an upper cutting edge formed on said portion, a lower cutting edge formed on said portion, said edges gradually diverging from one another from a pointed extremity on said portion, a gradually rising upwardly curved edge extending back from said upper cutting edge formed as a cutting edge, a lower deep cutting edge extending back from said lower cutting edge and curving downwardly toward the fish, and each blade having a transverse curvature, the upwardly curved cutting edge and the transverse curvature of each blade being determined by the anatomy and size of the fish to be filleted.

26. A filleting tool for a fish-dressing machine, comprising a pair of spaced elongated blades, an adjustable means for mounting said blades in proper relationship to the machine, said blade comprising an elongated narrow forward portion, an upper cutting edge formed on said portion, a lower cutting edge formed on said portion, said edges gradually diverging from one another from a pointed extremity on said portion, a gradually rising upwardly curved edge extending back from said upper cutting edge and formed as a cutting edge, a lower deep cutting edge extending back from said lower cutting edge and curved downwardly toward the fish, and each blade having a transverse curvature, the upwardly curved cutting edge curving outwardly from front to rear and said cutting edge and the transverse curvature of each blade being made to conform to the curved shape of the sides of the prismatic portion of the spinal column of the particular class of fish on which said tool is to operate.

27. In a fish-dressing machine, a fish conveyer, means on the conveyer for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in the rear of the slitting knives, means for mounting said tool to operate upon the sides of the prismatic portion of the backbone, said tool comprising a pair of spaced elongated blades between which said prismatic portion passes and a cutting edge on each blade curved to cut close to the side of the prismatic portion of said bone, the front portions of said blades lying in parallel planes and having slightly curved under-edges opposite said curved cutting edges, said under-edges having their forward portions formed as cutting edges and their rearward portions made blunt and shaped to be positioned further from the surface upon which the fish rests than said under-edges are positoned at their forward portions, and a device situated between the slitting knives and adapted to rest on the fish.

28. In a fish-dressing machine, a fish conveyer, means on the conveyer for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in the rear of the slitting knives, means for mounting said tool to operate upon the sides of the prismatic portion of the backbone, said tool comprising a pair of spaced elongated blades between which said prismatic portion passes, and a cutting edge on each blade curved to cut close to the side of the prismatic portion of the backbone, the front portions of said blades lying in parallel planes and having under-edges opposite said curved cutting edges, said under-edges being formed as cutting edges and approaching nearer to the surface upon which the fish rests as it approaches the rear of the tool, and a device situated between the slitting knives and adapted to rest on the fish.

29. In a fish-dressing machine, a fish conveyer, means on the conveyer for engaging the tail of the fish after it has been decapitated and eviscerated, a pair of rotatably driven spaced parallel circular slitting knives associated with the conveyer and arranged to slit the fish on each side of the oval portion of the backbone, means for moving said knives into an inoperative position on reaching the prismatic portion of the backbone, a filleting tool in the rear of the slitting knives, means for mounting said tool to operate on the sides of the prismatic portion of the backbone, said tool comprising a pair of spaced elongated blades between which said prismatic portion passes, each blade having a cutting edge curved to conform to the curved shape of the side of said prismatic portion and thereby cut close thereto, a second cutting edge being provided on each blade and being shaped to cut through the back of the fish to cause the tool to divide the fish into two fillets, one on each side of the backbone, and a device situated between the slitting knives and adapted to rest on the fish.

30. In a fish-dressing machine, a fish conveyer, means for holding the fish on the conveyer after it has been decapitated and eviscerated, means for slitting the fish on each side of the oval portion of the backbone, and means for filleting the fish, comprising blades having cutting edges curved to make a cut that conforms to the curved shape of the sides of the prismatic portion of the backbone.

31. In a fish-dressing machine, a fish conveyer, means for holding the fish on the conveyer after it has been decapitated and eviscerated, means for slitting the fish on each side of the oval portion of the backbone, and means for filleting the fish, comprising blades having front portions lying in substantially parallel planes and rear portions curved transversely to conform to the curved lateral shape of the prismatic portion of the backbone.

HAROLD STANLEY ROWTON.
JOHN LESLIE ROWTON.